(12) United States Patent
Hoshino

(10) Patent No.: US 6,557,526 B1
(45) Date of Patent: May 6, 2003

(54) SETTING MINIMUM SPARK ADVANCE FOR BEST TORQUE IN AN INTERNAL COMBUSTION ENGINE

(75) Inventor: Masato Hoshino, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/263,855

(22) Filed: Oct. 4, 2002

(30) Foreign Application Priority Data

Nov. 9, 2001 (JP) ........................................ 2001-344645

(51) Int. Cl.[7] ................................................. F02P 5/00
(52) U.S. Cl. .............................. 123/406.26; 123/406.47
(58) Field of Search ...................... 123/406.26, 406.47, 123/406.11, 406.12, 406.19

(56) References Cited

U.S. PATENT DOCUMENTS 5,211,147 A * 5/1993 Ward ..................... 123/406.47
5,546,905 A * 8/1996 Fukui ..................... 123/406.41
5,887,568 A    3/1999 Takeyama et al.

* cited by examiner

*Primary Examiner*—Bibhu Mohanty
(74) *Attorney, Agent, or Firm*—Foley & Lardner

(57) ABSTRACT

An internal combustion engine (1) causes an air-fuel mixture produced in a combustion chamber (23) to burn by means of ignition using a spark plug (24). A programmable controller (20) calculates a reaction probability expressing the combustibility of the air-fuel mixture inside the combustion chamber (23) and the combustion rate of the air-fuel mixture on the basis of the operating conditions of the engine 1 (S13, S27, S32). An air-fuel mixture combustion period is calculated on the basis of the volume of the combustion chamber at the combustion start timing, the reaction probability, and the combustion rate (S29, S34). On the basis of this combustion period, a target ignition timing of the spark plug (24) can be accurately set under a small calculation load.

12 Claims, 8 Drawing Sheets

SETTING MINIMUM SPARK ADVANCE FOR BEST TORQUE IN AN INTERNAL COMBUSTION ENGINE

FIELD OF THE INVENTION

This invention relates to the calculation of the minimum spark advance for best torque in a spark ignition-type internal combustion engine.

BACKGROUND OF THE INVENTION

U.S. Pat. No. 5,887,568 discloses a calculation method for minimum spark advance for best torque ( hereinafter referred to as MBT) in a spark ignition-type internal combustion engine. This method calculates the ignition timing corresponding to MBT from the time period required for the combustion of air-fuel mixture in a cylinder without measuring the pressure inside the cylinder.

Specifically, the total gas weight in cylinder Gcyl and the unburnt gas density in cylinder ROU are respectively calculated, and the ignition timing corresponding to MBT is calculated on the basis of the ratio thereof.

SUMMARY OF THE INVENTION

The unburnt gas density in cylinder ROU is a value obtained by dividing the unburnt gas mass by the unburnt gas volume. It is therefore logical to assume that the unburnt gas density can be determined accurately by detecting the values of the unburnt gas mass and unburnt gas volume. In actuality, accurately measuring and estimating the unburnt gas volume in cylinder is difficult. Thus in the aforementioned prior art, the unburnt gas density is calculated on the basis of the cylinder charging efficiency ITAC.

In this case, the charging efficiency ITAC is a mass ratio. However, the volumes of identical masses of gas differ according to pressure and temperature, and it is therefore difficult to calculate the unburnt gas density with precision by means of a calculation which depends only on the charging efficiency ITA.

Moreover, both the total gas weight in cylinder Gcyl and the unburnt gas density in cylinder ROU have units relating to mass. In the prior art, these values are first calculated individually, and division thereof is performed later. However, since the calculation process of Gcyl as well as that of Rou are complicated, the calculation method according to the prior art suffered a huge calculation load.

It is therefore an object of this invention to improve the calculation precision of the minimum spark advance for best torque while achieving a reduction in the calculation load.

In order to achieve the above object, this invention provides an ignition timing control device for use with an internal combustion engine which performs a combustion of an air-fuel mixture in a combustion chamber according to an ignition by a spark plug. The device comprises a sensor which detects an operating condition of the engine and a programmable controller.

The controller is programmed to calculate a reaction probability which expresses a combustibility of the air-fuel mixture in the combustion chamber on the basis of the operating condition, calculate a combustion rate of the air-fuel mixture in the combustion chamber on the basis of the operating condition, calculate an air-fuel mixture combustion period on the basis of a combustion chamber volume at a combustion start timing when the combustion period starts, the reaction probability and the combustion rate to cause the combustion period to be longer as the combustion chamber volume increases, to cause the combustion period to be shorter as the reaction probability increases, and to cause the combustion period to be shorter as the combustion rate increases, calculate a target ignition timing by subtracting the combustion period from a first predetermined timing which is later than the combustion period start timing, and control an ignition timing of the spark plug to coincide with the target ignition timing.

This invention also provides an ignition timing control method for an internal combustion engine which performs a combustion of an air-fuel mixture in a combustion chamber according to an ignition by a spark plug. The method comprises detecting an operating condition of the engine, calculating a reaction probability which expresses a combustibility of the air-fuel mixture in the combustion chamber on the basis of the operating condition, calculating a combustion rate of the air-fuel mixture in the combustion chamber on the basis of the operating condition, calculating an air-fuel mixture combustion period on the basis of a combustion chamber volume at a combustion start timing, the reaction probability and the combustion rate to cause the combustion period to be longer as the combustion chamber volume increases, to cause the combustion period to be shorter as the reaction probability increases, and to cause the combustion period to be shorter as the combustion rate increases, calculating a target ignition timing by subtracting the combustion period from a first predetermined timing which is later than the combustion period start timing, and controlling an ignition timing of the spark plug to coincide with the target ignition timing.

The details as well as other features and advantages of this invention are set forth in the remainder of the specification and are shown in the accompanying drawings.

DESCRIPTION OF THE PREFERRED EMBODIMENTS

Figure 1:
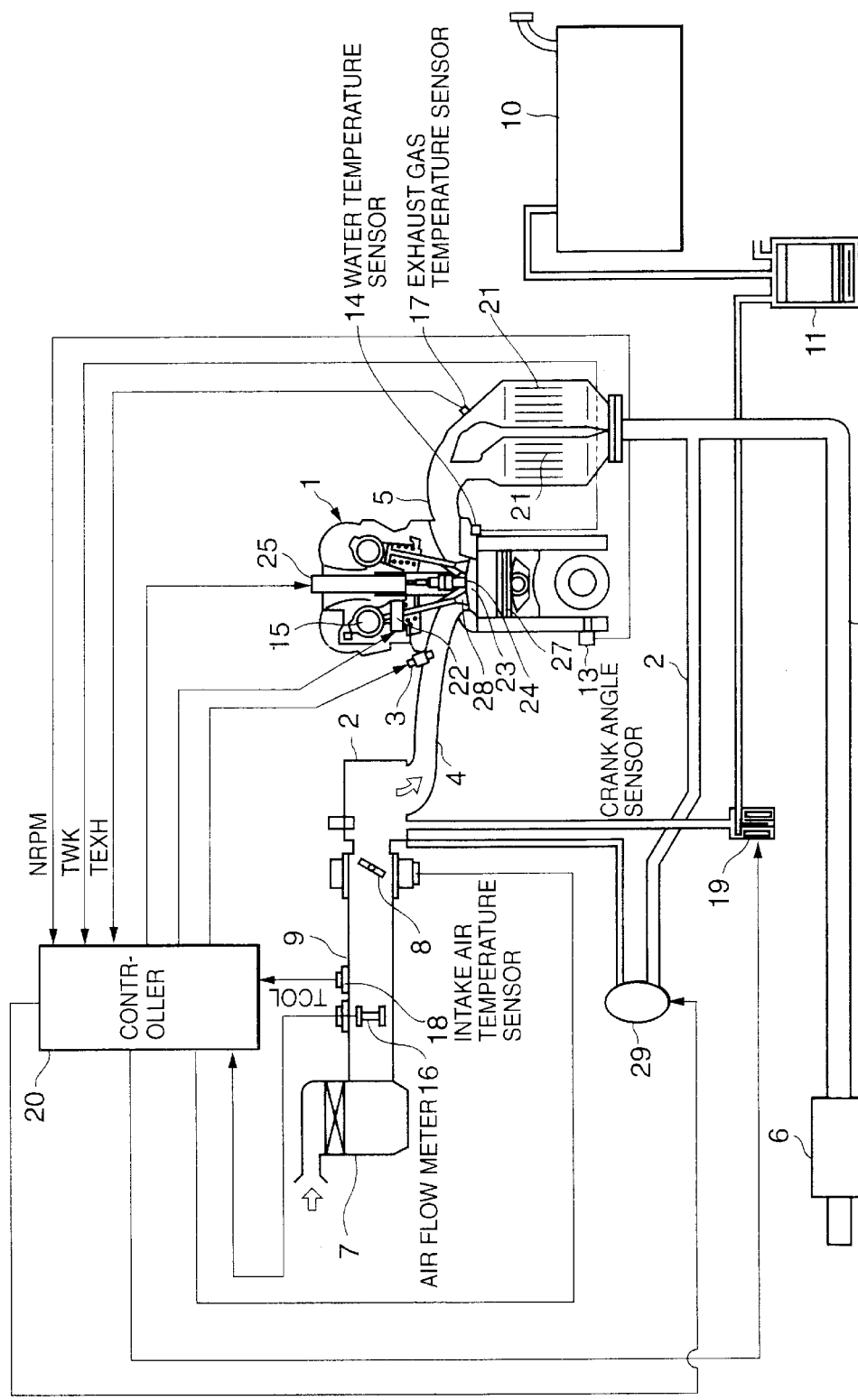
FIG. 1 is a schematic diagram of an ignition control device in an internal combustion engine according to this invention.

Referring to FIG. 1 of the drawings, a multi-cylinder internal combustion engine 1 aspirates air into each combustion chamber 23 from an intake passage 9 via an intake collector 2 and an intake manifold 4. In the intake manifold 4, a fuel injector 3 which injects fuel during air intake is provided for each combustion chamber 23. The fuel injected by the fuel injector 3 is mixed with the intake air in the intake manifold 4 to produce air-fuel mixture in the combustion chamber 23. The air-fuel mixture produced in the combustion chamber 23 is ignited by a spark plug 24, whereupon the resultant combustion causes a piston 27 to perform a reciprocating motion. The spark plug 24 generates a spark in response to a current which is applied to an ignition coil 25.

Exhaust gas which is produced as a result of combustion is discharged into the atmosphere from an exhaust manifold 5 via an exhaust passage 26 and a muffler 6. A three-way catalytic converter 21 for performing exhaust gas purification is provided in the exhaust manifold 5.

An air cleaner 7 for purifying intake air and an electronic throttle 8 for adjusting the amount of intake air are provided in the intake passage 9. An intake valve 28 is provided between the intake manifold 5 and the combustion chamber 23. The intake valve 28 is a valve in which open/close timing can be varied arbitrarily by means of a valve timing variation mechanism 22 which uses a cam.

The fuel which is injected by the fuel injector 3 is supplied from a fuel tank 10. The fuel tank 10 is equipped with a canister 11 which purges fuel vapor inside the tank to the intake collector 2 via a purge control valve 19.

A part of the exhaust gas in the exhaust passage 26 is recirculated to the collector 2 via an exhaust gas recirculating passage (EGR passage) 12 comprising an exhaust gas recirculating control valve (EGR control valve) 29.

The current supplied to the ignition coil 25 which controls the ignition timing of the spark plug 24, the setting of the valve open/close timing by the valve timing variation mechanism 22, the amount of fuel to be injected and the injection timing of the fuel injector 3, the degree of opening of the electronic throttle 8, the degree of opening of the EGR control valve 29, and the degree of opening of the purge control valve 19 are each controlled by a signal outputted from a controller 20.

The controller 20 comprises a microcomputer provided with a central processing unit (CPU), a read-only memory (ROM), a random access memory (RAM), and an input/output interface (I/O interface). The controller may also comprise a plurality of microcomputers.

In order to perform the aforementioned control, signals from a crank angle sensor 13 which detects a crank angle and an engine rotation speed NRPM, a water temperature sensor 14 which detects a cooling water temperature, an air flow meter 16 which detects an intake flow rate in the intake passage 9, an exhaust gas temperature sensor 17 which detects an exhaust gas temperature, and an intake air temperature sensor 18 which detects an intake air temperature are respectively input into the controller 20.

Control of the ignition timing of the spark plug 24, which is executed by the controller 20, will now be described.

Figure 2:
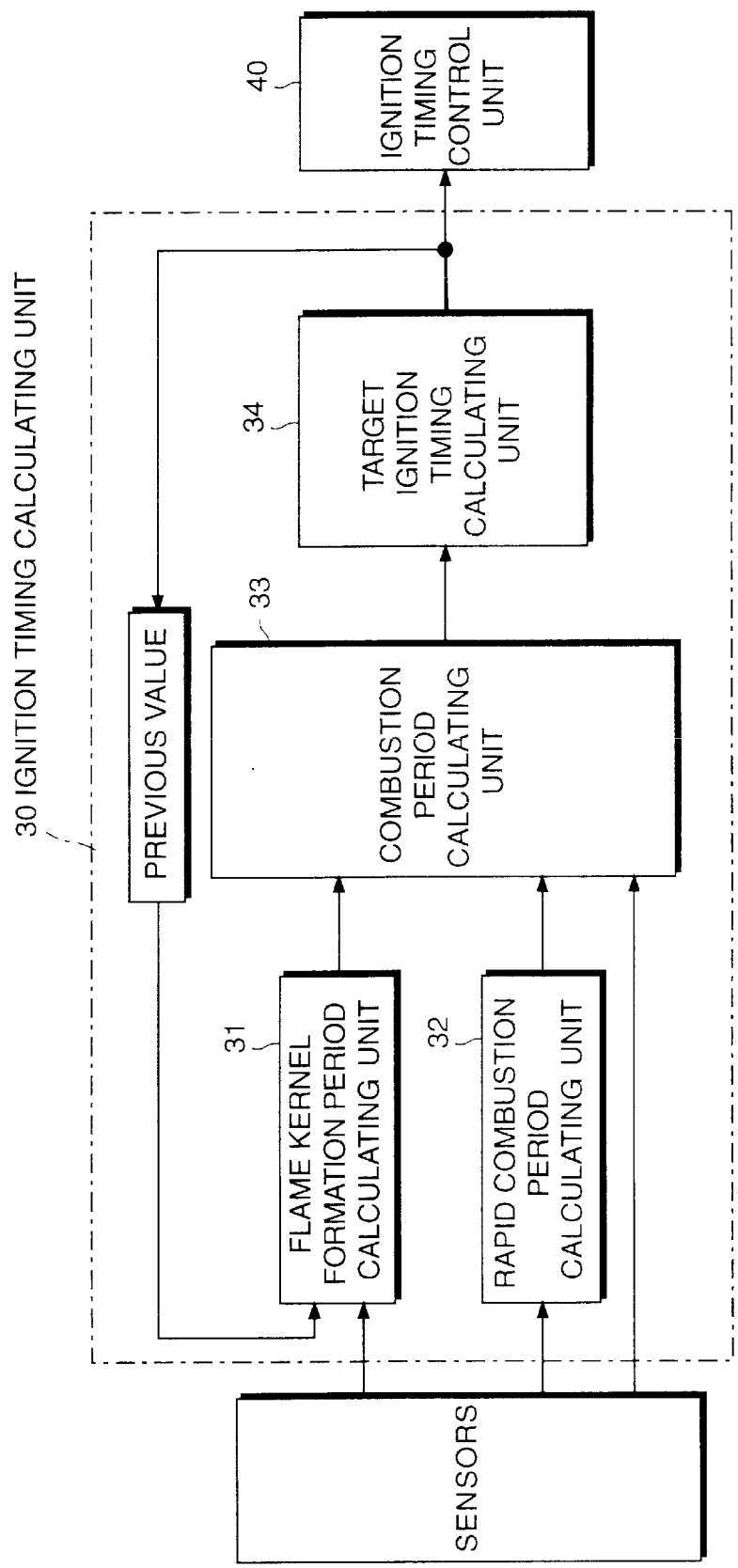
FIG. 2 is a block diagram explaining the functions of a controller according to this invention.

Referring to FIG. 2, the controller 20 is equipped with an ignition timing calculating unit 30 and an ignition timing control unit 40 in order to control the ignition timing. The ignition timing calculating unit 30 comprises a flame kernel formation period calculating unit 31, a rapid combustion period calculating unit 32, a combustion period calculating unit 33, and a target ignition timing calculating unit 34. Note that each of these units are virtual units indicating a function of the controller 20 and do not physically exist.

The flame kernel formation period calculating unit 31 calculates the period from the ignition of the air-fuel mixture to the formation of a flame kernel. The rapid combustion period calculating unit 32 calculates the period from the formation of the flame kernel to the point at which combustion pressure reaches a maximum value Pmax. The combustion period calculating unit 33 calculates the combustion period from ignition to maximum combustion pressure Pmax using the flame kernel formation period and the rapid combustion period.

The target ignition timing calculating unit 34 calculates a target ignition timing corresponding to MBT on the basis of the combustion period. The ignition timing control unit 40 applies an electric current to the ignition coil 25 such that the spark plug 24 ignites at the target ignition timing.

Figure 3:
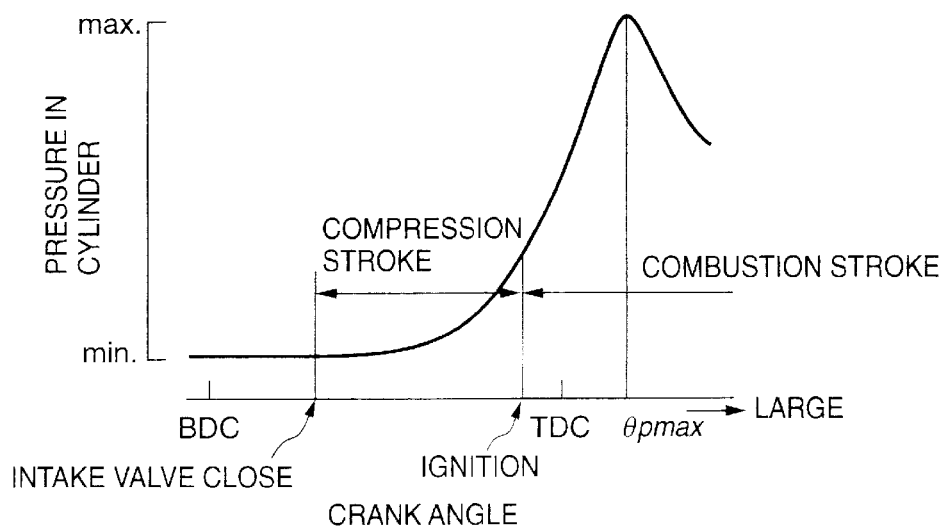
FIG. 3 is a diagram explaining the relationship between a pressure in cylinder and a crank angle during combustion.

Referring to FIG. 3, when the air-fuel mixture is ignited at MBT, the crank angle at which the combustion pressure of the air-fuel mixture reaches the maximum value Pmax is set as a reference crank angle θpmax (degree). The reference crank angle θpmax rarely fluctuates, regardless of the combustion system.

Figure 4:
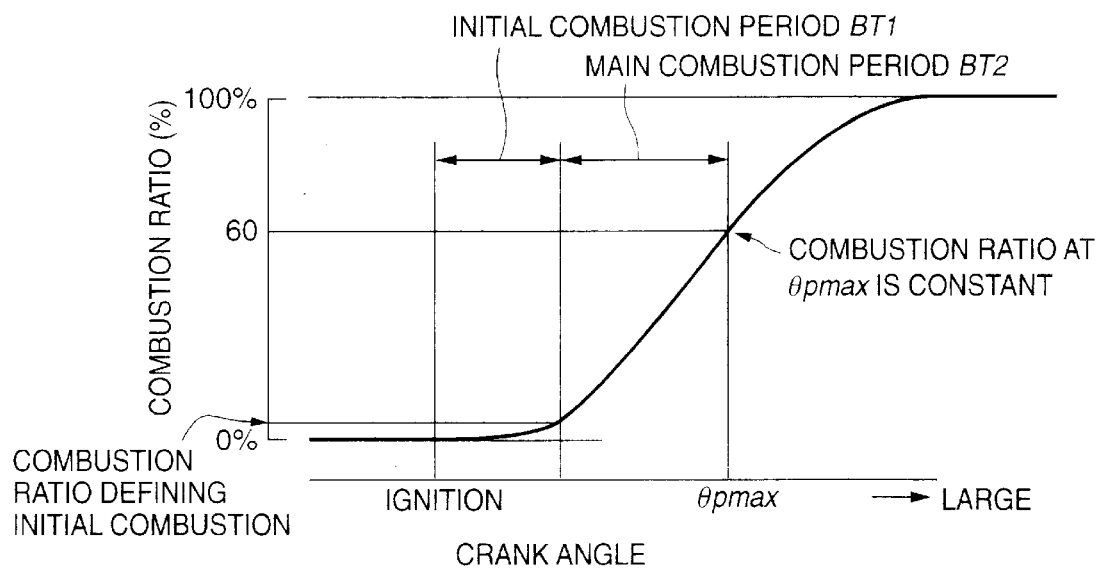
FIG. 4 is a diagram explaining the relationship between a combustion mass proportion and the crank angle.

Referring next to FIG. 4, a combustion mass proportion R, which expresses the mass ratio of burnt fuel from the fuel supplied to the combustion chamber 23, is zero percent at the time of ignition, and reaches a hundred percent in accordance with complete combustion. The combustion mass proportion Rmax at the reference crank angle θpmax is fixed at approximately sixty percent.

The period from when the combustion mass proportion R is zero percent to when the combustion mass proportion R reaches approximately sixty percent at the reference crank angle θpmax is divided into an initial combustion period immediately after ignition in which there is almost no change in either the combustion mass proportion or the combustion pressure, and a main combustion period in which the combustion mass proportion and combustion pressure increase dramatically. The initial combustion period is the period from the beginning of combustion to the production of a flame kernel. The flame kernel is produced when the combustion mass proportion is between two percent and ten percent.

During this period, combustion pressure, combustion temperature increase slowly, and hence the initial combustion period is long in relation to change in the combustion mass proportion.

The length of the initial combustion period is easily affected by variations in temperature or pressure inside the combustion chamber 23.

In the main combustion period, meanwhile, the flame is propagated from the flame kernel to an outer laminar flow region and the combustion rate increases rapidly. As a result, change in the combustion mass proportion in the main combustion period is greater than the change in the combustion mass proportion in the initial combustion period. In other words, the time required for the unit variation of combustion mass proportion is shorter in the main combustion period than in the initial combustion period. The length of the main combustion period is unlikely to be affected by variations in temperature or pressure inside the combustion chamber 23.

The controller 20 classifies the period up to the air-fuel mixture mass which has burnt reaching two percent as the initial combustion period BT1, and classifies the period following the end of the initial combustion period BT1, when the air-fuel mixture which has burnt after the initial combustion period reaches the reference crank angle θpmax, as the main combustion period BT2.

A target ignition timing MBTCYCL is determined by calculating the combustion period BT through addition of the initial combustion period BT1 to the main combustion period BT2, and subtracting the combustion period BT from the reference crank angle θpmax.

Referring next to the flowcharts in FIGS. 5 through 8, the setting of the target ignition timing MBTCYCL will be explained.

FIGS. 5 through 8 each illustrates an independent routine.

The controller 3 executes these routines at intervals of ten milliseconds while the engine 1 is running.

Figure 5:
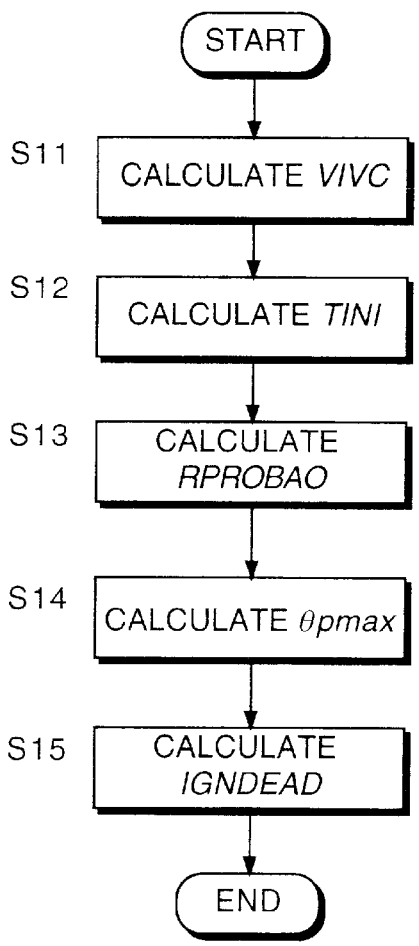
FIG. 5 is a flowchart explaining a routine performed by the controller for calculating various parameters to be used in the calculation of a combustion period.

FIG. 5 shows a routine for calculating various parameters necessary for the calculation of the combustion period BT.

In a first step S11, the controller 3 calculates a volume VIVC of the combustion chamber 23 at the closing timing of the intake valve 28. The volume VIVC of the combustion chamber 23 is determined by a stroke position of the piston 27. The stroke position of the piston 27 is determined by the crank angle.

Figure 9:
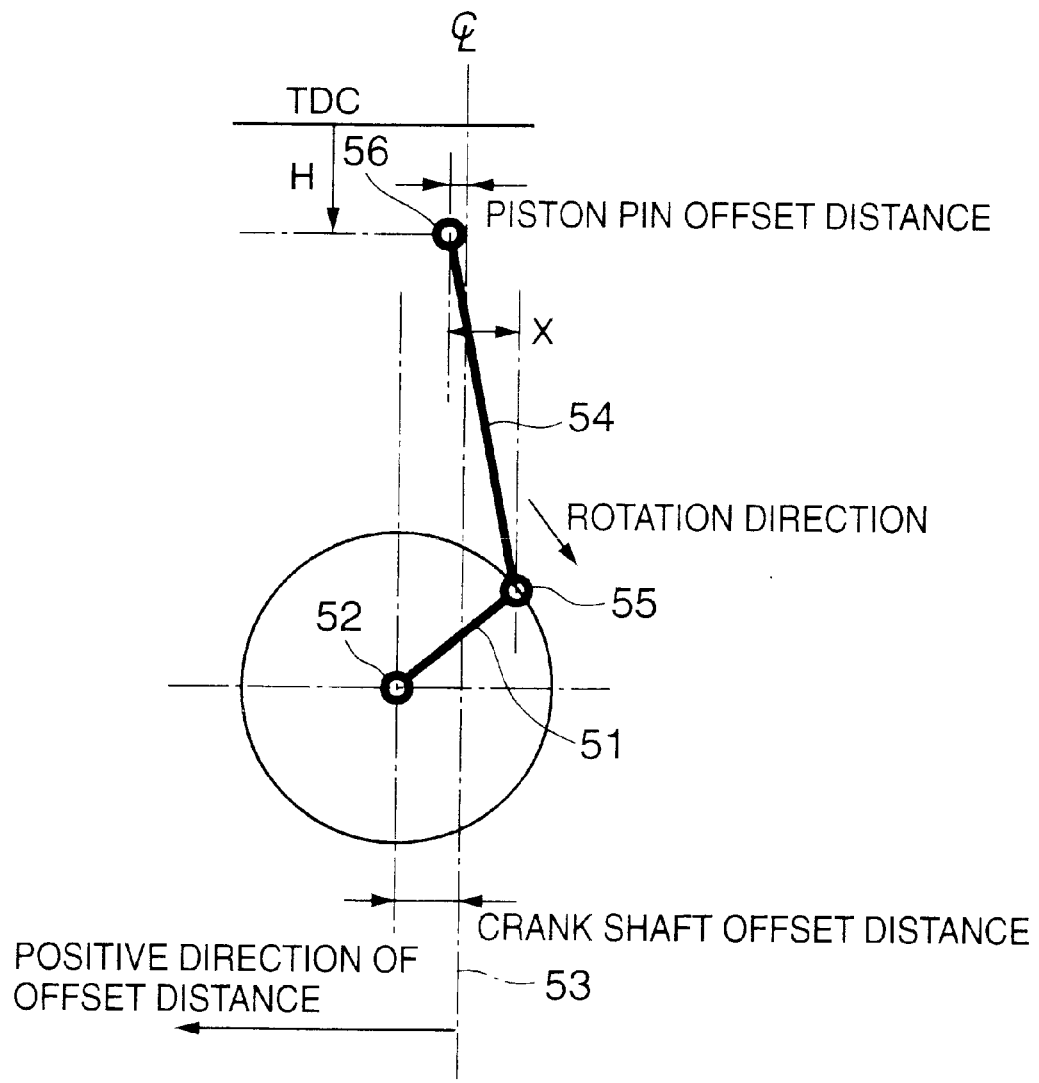
FIG. 9 is a diagram explaining the positional relationship between a crankshaft and a connecting rod in the internal combustion engine.

Referring to FIG. 9, a case is considered in which the rotational center 52 of the crankshaft 51 of the engine 1 is offset from the central axis 53 of the cylinder. A connecting rod 54, a node 55 connecting the connecting rod 54 and the crankshaft 51, and a piston pin 56 connecting the connecting rod 54 and the piston relate to each other as shown in the figure. The volume VIVC of the combustion chamber 23 at this time can be expressed by the following equations (1) through (5).

$$VIVC = f1(\theta_{evc}) \quad (1)$$
$$= Vc + \frac{\pi}{4} \cdot D^2 \cdot H$$

$$Vc = \frac{\frac{\pi}{4} \cdot D^2 \cdot ST}{\varepsilon - 1} \quad (2)$$

$$H = \sqrt{\left(CND + \frac{ST^2}{2}\right) - (CR_{off} - PIS_{off})^2 - \left\{\frac{ST}{2} \cdot \cos(\theta_{evc} + \theta_{off})\right\} + \sqrt{CND^2 - X^2}} \quad (3)$$

$$X = \frac{ST}{2} \cdot \sin(\theta_{evc} + \theta_{off}) - CR_{off} + PIN_{off} \quad (4)$$

$$\theta_{off} = \arcsin\left(\frac{CR_{off} - PIS_{off}}{CND \cdot \frac{ST}{2}}\right) \quad (5)$$

where, Vc=the gap volume (m³),
ε=the compression ratio,
D=the diameter of the cylinder bore (m),
ST=the entire stroke length of the piston (m),
H=the distance from the top dead center (TDC) of the piston pin 56 (m), CND=the length of the connecting rod 54 (m),
$CR_{off}$=the offset distance of the node 55 from the cylinder central axis 53 (m),
$PIN_{off}$=the offset distance of the crankshaft rotational center 52 from the cylinder central axis 53 (m),
$\theta_{evc}$=the crank angle at the closing timing of the intake valve 23 (degrees after top dead center (deg. ATDC)),
$\theta_{off}$=the angle subtended by the line joining the piston pin 56 and the crankshaft rotational center 52 at TDC and a vertical line (degrees), and
X=the horizontal distance between the node 55 and the piston pin 56 (m).

As described above, the closing timing of the intake valve 28 is determined by a signal from the controller 3 to the valve timing variation mechanism 22 and is therefore known in advance. If the crank angle $\theta_{evc}$ corresponding to the closing timing of the intake valve 28 is substituted in equations (1) through (5), the volume VIVC of the combustion chamber 23 at the closing timing of the intake valve 28 can be calculated. Accordingly, as concerns practical usage, the volume VIVC of the combustion chamber 23 at the closing timing of the intake valve 28 may be provided as a constant.

Next, in a step S12, a combustion chamber temperature TINI at the closing timing of the intake valve 28 is calculated. The combustion chamber temperature TINI is dependent on the temperature TCOL inside the intake collector 2, the exhaust gas temperature TEXH, and the in-cylinder residual exhaust gas ratio EGRREM, and is expressed by the following equation (6).

$$TINI = f2(TCOL, TEXH, EGRREM) \quad (6)$$
$$= TCOL \cdot (1 - EGRREM) + TEXH \cdot EGRREM$$

Herein, kelvins (K) are used as the unit of measurement of TINI, TCOL, and TEXH, and EGRREM is a ratio.

The temperature TCOL inside the intake collector 2 and the exhaust gas temperature TEXH are detected by the intake air temperature sensor 18 and the exhaust gas temperature sensor 17 respectively.

The residual exhaust gas ratio EGRREM is a value dependent on the degree of opening of the EGR control valve 29. As described above, the controller 20 also controls the degree of opening of the EGR control valve 29, and hence the residual exhaust gas ratio EGRREM can be regarded by the controller 20 as a known value.

Next, in a step S13, a reaction probability RPROBAO which expresses the combustibility of the air-fuel mixture is calculated. The reaction probability RPROBAO is a non-dimensional value dependent on the residual exhaust gas ratio EGRREM, the cooling water temperature TWK of the engine 1, and an equivalence ratio TFBYA of the air-fuel mixture. Kelvins (K) are used as the unit of measurement of the cooling water temperature TWK. The cooling water temperature TWK is detected by the water temperature sensor 14.

The equivalence ratio TFBYA is a non-dimensional value defined in the following equation (7) in accordance with "The Internal Combustion Engine" by John B. Heywood (ISBN0-07-028637-X).

$$TFBYA = \frac{fuel - air\ ratio}{stoichiometric\ fuel - air\ ratio} \quad (7)$$

The controller 20 controls the fuel-air ratio through the amount of injected fuel from the fuel injector 3. The equivalence ratio TFBYA is therefore known to the controller 20.

As is illustrated in the following equation (8), the reaction probability RPROBAO is expressed by the functions of the residual exhaust gas ratio EGRREM, the cooling water temperature TWK of the engine 1, and the equivalence ratio TFBYA.

$$RPROBA = f3(EGRREM, TWK, TFBYA) \tag{8}$$

The maximum value of the reaction probability obtained by the combination of three parameters is set at a hundred percent, the relationship between these parameters and the reaction probability RPROBA is acquired through experiment, and the controller 20 stores in the memory the acquired reaction probability RPROBA in advance as parameter-based maps. The reaction probability RPROBA is determined in the step S13 by retrieving the parameter-based maps.

Figure 10:
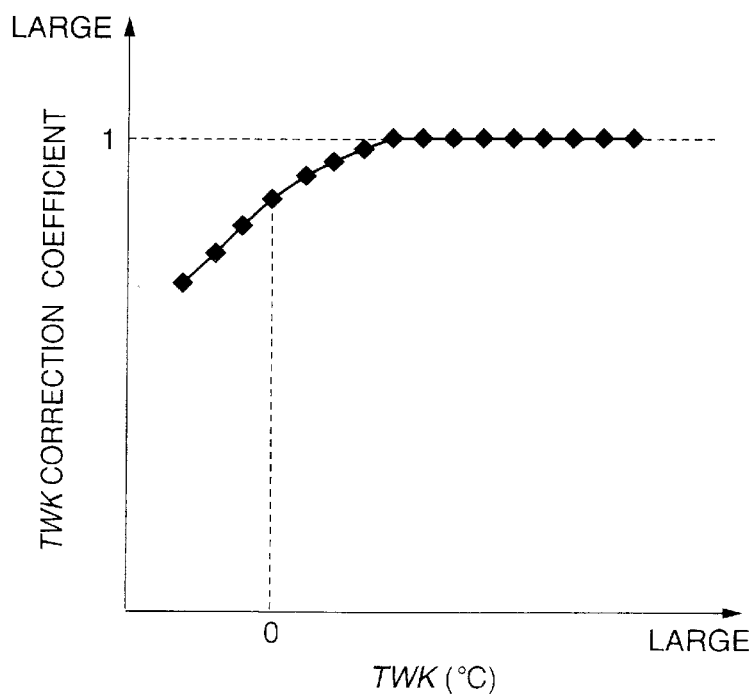
FIG. 10 is a diagram illustrating the characteristic of a cooling water correction coefficient map stored by the controller.
Figure 11:
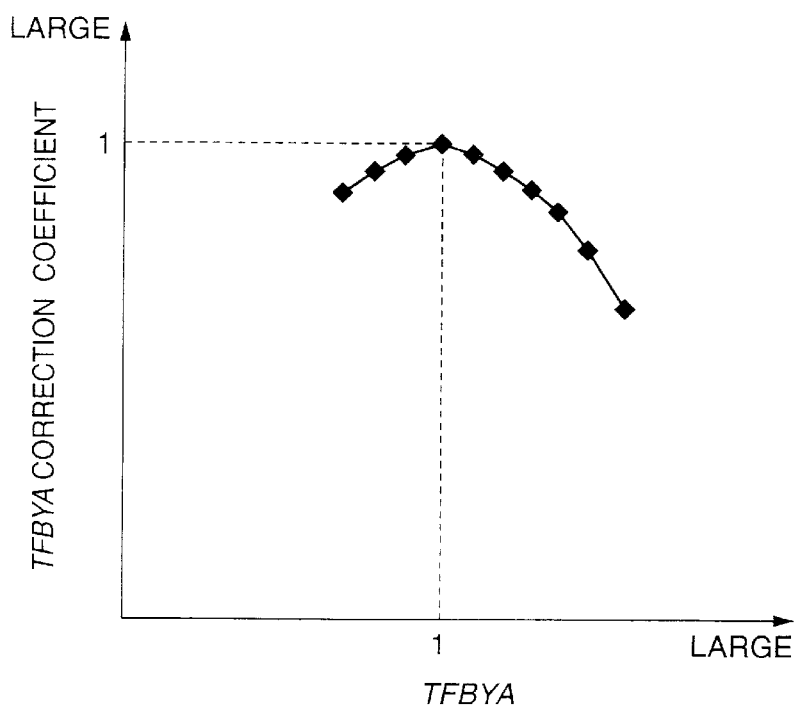
FIG. 11 is a diagram illustrating the characteristic of an equivalence ratio correction coefficient map stored by the controller.

Specifically, a water temperature correction coefficient map in accordance with the cooling water temperature TWK and having a characteristic as shown in FIG. 10, a residual exhaust gas ratio correction coefficient map which is set in a similar manner, and an equivalence ratio correction coefficient map in accordance with the equivalence ratio TFBYA and having a characteristic as shown in FIG. 11, are stored in the memory in advance. The maximum value of each correction coefficient is unity, and the reaction probability is determined by multiplying the maximum reaction probability value of a hundred percent by the product of the three correction coefficients.

To describe the characteristic of each map, the water temperature correction coefficient shown in FIG. 10 increases as the cooling water temperature TWK rises and becomes unity when the cooling water temperature TWK is eighty degrees centigrade (80° C.) or greater. The equivalence ratio correction coefficient shown in FIG. 11 reaches the maximum value of unity when the equivalence ratio TFBYA is 1.0, or in other words when the equivalence ratio TFBYA corresponds to the stoichiometric air-fuel ratio.

The equivalence ratio correction coefficient decreases when the equivalence ratio is either greater than or less than 1.0. The residual exhaust gas ratio correction coefficient is not shown in the drawings, but increases as the residual exhaust gas ratio EGRREM decreases and becomes unity when the residual exhaust gas ratio EGRREM is zero.

Next, in a step S14, the controller 20 calculates the reference crank angle θpmax. As noted above, the reference crank angle θpmax rarely fluctuates, but nevertheless has a tendency to advance in accordance with a rise in the rotation speed NRPM of the engine 1. The reference crank angle θpmax may be expressed as a function of the engine rotation speed NRPM according to the following equation (9).

$$\theta p\ max = f4(NRPM) \tag{9}$$

Figure 12:
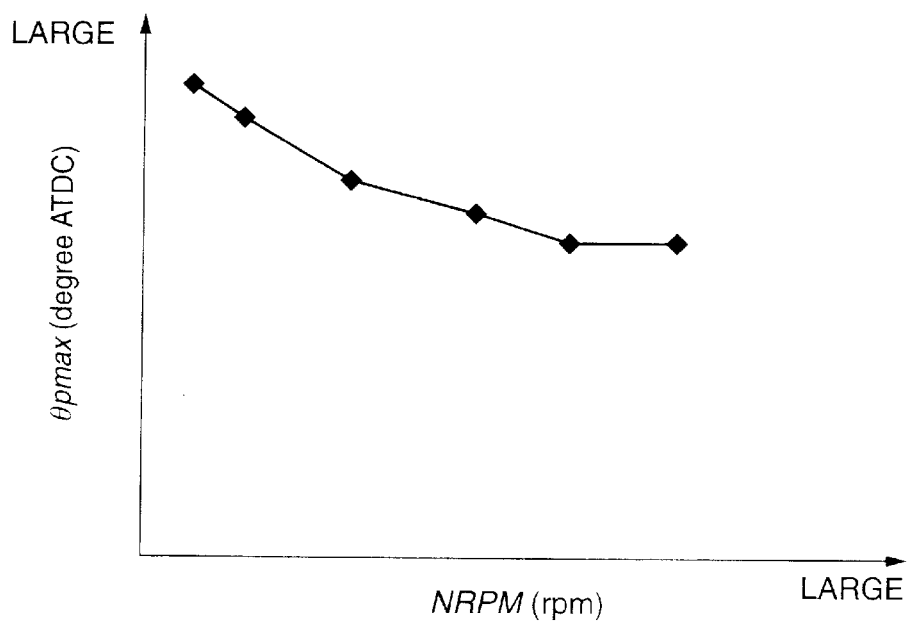
FIG. 12 is a diagram illustrating the characteristic of a reference crank angle map stored by the controller.

The controller 20 determines the reference crank angle θpmax on the basis of the engine rotation speed NRPM by retrieving the map having the characteristic shown in FIG. 12 which was stored in the memory in advance. Degrees after top dead center (herein after abbreviated to "deg. ATDC") are used as the unit of measurement of θpmax, and revolutions per minute (herein after abbreviated to "rpm") are used as the unit of measurement of NRPM. Note, however, that the reference crank angle θpmax may be considered constant for ease of calculation.

Next, in a step S15, an angle corresponding to ignition dead time IGNDEAD is calculated. Ignition dead time IGNDEAD corresponds to the crank angle from the output of an ignition signal from the controller 20 to the ignition coil 25 to the point at which the spark plug 24 actually ignites. The angle corresponding to ignition dead time IGNDEAD is expressed by the following equation (10).

$$IGNDEAD = f5(IGNDEADTM, NRPM) \tag{10}$$

where, IGNDEADTM=ignition dead time.

Degrees are used as the unit of measurement of IGNDEAD, and microseconds are used as the unit of measurement of IGNDEADTM.

Here, the ignition dead time IGNDEADTM is set at 200 microseconds. The angle corresponding to ignition dead time IGNDEAD, which is the crank angle which corresponds to ignition dead time IGNDEADTM, is calculated from the engine rotation speed NRPM.

Figure 6:
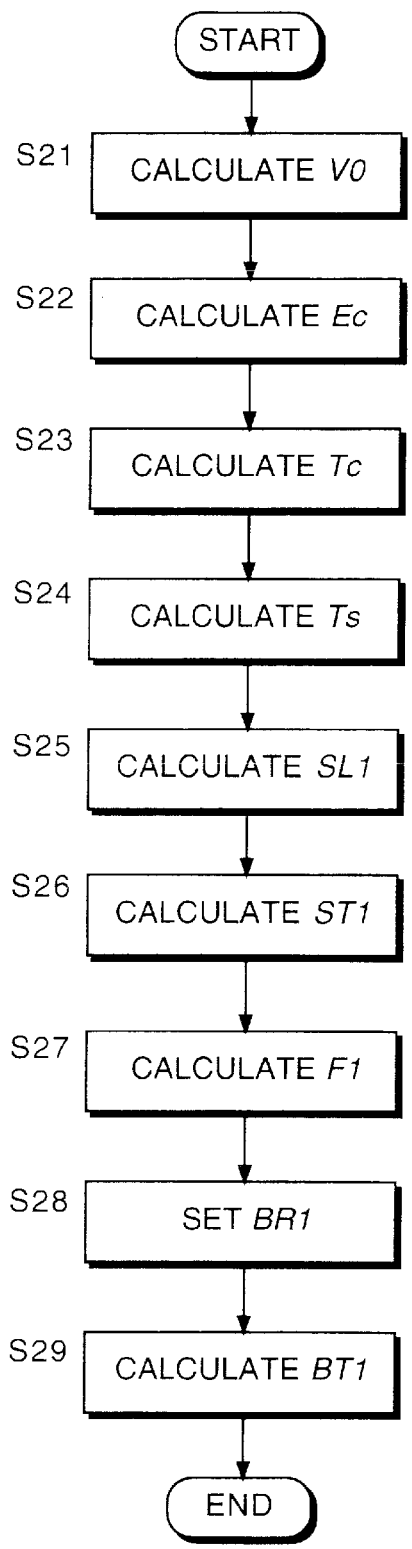
FIG. 6 is a flowchart explaining a routine performed by the controller for calculating an initial combustion period BT1.

FIG. 6 shows a calculation routine for the initial combustion period BT1.

First, in a step S21, the controller 20 calculates a volume $V_0$ of the combustion chamber 23 at the combustion starting point. Here, the combustion starting point is considered equal to the target ignition timing MBTCYL, and hence the volume $V_0$ is calculated from the target ignition timing MBTCYCL, as is illustrated in the following equation (11). The target ignition timing MBTCYCL is a value which is the objective of execution of the routines in FIGS. 5 through 8. Accordingly, a value acquired through a previous execution of the routines in FIGS. 5 through 8 is used here as the target ignition timing MBTCYCL.

$$V_0 = f6(MBTCYL) \tag{11}$$

Cubic meters are used as the unit of measurement of $V_0$, and degrees before top dead center (deg. BTDC) are used as the unit of measurement of MBTCYL.

Specifically, the volume $V_0$ of the combustion chamber 23 at the target ignition timing MBTCYL is calculated from the stroke position of the piston 27 at the target ignition timing MBTCYL acquired through the previous execution of the routines in FIGS. 5 through 8 and the bore diameter of the combustion chamber 23. The volume VIVC of the combustion chamber 23 at the closing timing of the intake valve 28 was calculated in the step S11 in FIG. 5, and a similar calculation is performed here in respect of the target ignition timing MBTCYL. In terms of practical usage, the volume $V_0$ of the combustion chamber 23 at the target ignition timing MBTCYL can be provided as a constant.

Next, in a step S22, the controller 20 calculates the effective compression ratio Ec at the combustion starting point. As is illustrated in the following equation (12), the effective compression ratio Ec is the value of the cylinder volume $V_0$ at the combustion starting point divided by the volume VIVC of the combustion chamber 23 at the closing timing of the intake valve 28.

$$Ec = \frac{V_0}{VIVC} \tag{12}$$

In a next step S23, as is illustrated in the following equation (13), the controller 20 calculates a temperature increase ratio Tc inside the combustion chamber 23 from the closing point of the intake valve 28 to the combustion starting point on the basis of the effective compression ratio Ec.

$$Tc = Ec^{k-1} \tag{13}$$

where, k=a coefficient.

The value of the coefficient k in relation to air is 1.4. The coefficient k may be applied in relation to air-fuel mixture to give a nearly identical value. By determining the value of k in relation to air-fuel mixture through experiment, a further improvement in calculation precision is possible.

Figure 13:
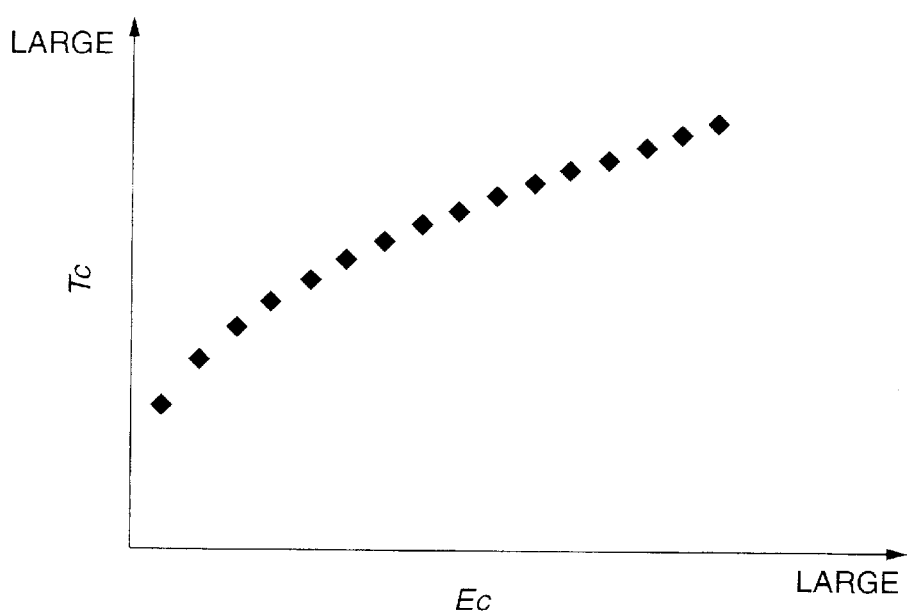
FIG. 13 is a diagram explaining the relationship between a temperature increase rate and an effective compression ratio calculated by the controller.

FIG. 13 shows the equation (13) in the form of a diagram. Accordingly, a map having such a characteristic may be stored in advance in the memory of the controller 20, and the temperature increase ratio Tc may be determined by searching the map instead of calculating by the equation (13), on the basis of the effective compression ratio Ec.

In a following step S24, the controller 20 calculates an ambient temperature Ts inside the combustion chamber 23 at the combustion starting point. The ambient temperature Ts inside the combustion chamber 23 at the combustion starting point is obtained by multiplying the temperature increase ratio Tc calculated in the step S23 by the combustion chamber temperature TINI at the closing timing of the intake valve 28 calculated in the step S12. Kelvins (K) are used as the measurement unit of Ts.

In a next step S25, the controller 20 calculates a laminar flow combustion velocity SL1 by means of the following equation (14), which is well known in the art. Meters/second are used as the measurement unit of the laminar flow combustion velocity SL1.

$$SL1 = SL_0 \cdot \left(\frac{Ts}{T_0}\right)^{2.18} \cdot \left(\frac{P}{P_0}\right)^{-0.16} \tag{14}$$

where, $T_0$=the reference temperature,
$P_0$=the reference pressure,
$SL_0$=the reference laminar flow flame velocity at reference temperature $T_0$ and reference pressure $P_0$,
Ts=the ambient temperature, and
P=the ambient pressure.

The reference temperature $T_0$, reference pressure $P_0$, and reference laminar flow flame velocity $SL_0$ are values which are determined in advance through experiment.

Under pressure which is equal to or greater than normal cylinder pressure of two bars, the pressure term $$\left(\frac{P}{P_0}\right)^{-0.16}$$

in equation (14) becomes a small value. The reference laminar flow flame velocity $SL_0$ may therefore be defined only by the reference temperature $T_0$ with the pressure term $$\left(\frac{P}{P_0}\right)^{-0.16}$$

as a constant value.

Accordingly, the relationship between the ambient temperature Ts when the reference temperature $T_0$ is 550 (K), the reference laminar flow flame velocity $SL_0$ is 1.0 meter/sec, and the pressure term is 0.7, and the laminar flow flame velocity SL1 can be approximately defined by the following equation (15).

$$SL1 = 1.0 \cdot 0.7 \cdot \left(\frac{Ts}{550}\right)^{2.18} \tag{15}$$

In a next step S26, the controller 20 calculates a turbulence intensity coefficient ST1 in a turbulence region inside the combustion chamber 23 during the initial combustion period BT1. The turbulence intensity coefficient ST1 is dependent on the velocity of flow of the air which is taken into the combustion chamber 23 and the penetration of the fuel which is injected by the fuel injector 3. The velocity of flow of the air which is taken into the combustion chamber 23 is dependent on the form of the intake passage 9, the operating state of the intake valve 28, and the form of an intake port in which the intake valve 28 is installed. The penetration of the injected fuel is dependent on the injection pressure, the fuel injection period, and the fuel injection timing of the fuel injector 3. Ultimately, the turbulence intensity coefficient ST1 in the turbulence region inside the combustion chamber 23 is expressed by the following equation (16) as a function of the rotation speed NRPM of the engine 1.

$$ST1 = f9(NRPM) \tag{16}$$
$$= C1 \cdot NRPM$$

where, C1=a constant.

The turbulence intensity coefficient ST1 may also be determined from a map.

Subsequently, in step S27, the controller 20 calculates a combustion rate F1 from the laminar flow combustion rate SL1 and the turbulence intensity coefficient ST1 using the following equation (17).

$$F1 = SL1 \cdot ST1 \tag{17}$$

Meters/second are used as the unit of measurement of F1 and SL1.

In a next step S28, the controller 20 sets an air-fuel mixture mass BR1 which has burnt at the end point of the initial combustion period BT1 at two percent.

In a next step S29, the controller 20 determines the initial combustion period BT1 using the following equation (18).

$$BT1 = \frac{(NRPM \cdot 6) \cdot (BR1 \cdot V_0)}{RPROBA \cdot AF1 \cdot F1} \tag{18}$$

where, AF1=a reaction area of the flame kernel=a fixed value.

The (NRPM·6) in equation (18) is a measure taken to switch the unit of measurement from rpm to degrees. The unit of measurement of NRPM is rpm, the unit of measurement of BR1 and RPROBA is percent, the unit of measurement of $V_0$ is cubic meters, and the unit of measurement of F1 is meters/second. Degrees are used as the measurement unit of the initial combustion period BT1. The reaction area AF1 of the flame kernel is set by way of experiment.

Figure 7:
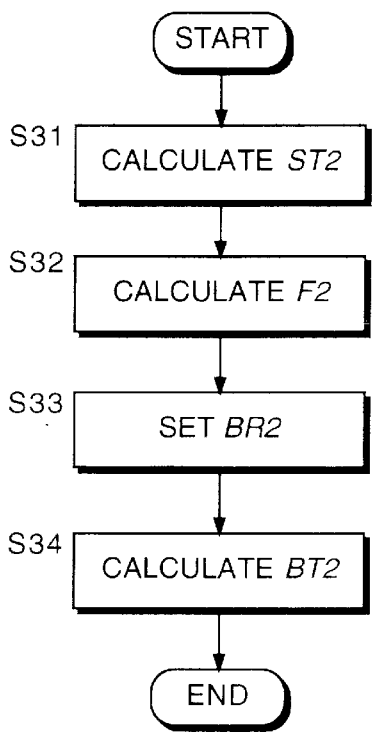
FIG. 7 is a flowchart explaining a calculation routine which is executed by the controller for calculating a main combustion period BT2.

FIG. 7 illustrates the calculation routine for the main combustion period BT2.

First, in a step S31, the controller 20 calculates a turbulence intensity coefficient ST2 in the main combustion period BT2. Similarly to the turbulence intensity coefficient ST1 in the initial combustion period BT1, the turbulence intensity coefficient ST2 is also expressed as a function of the rotation speed NRPM of the engine 1 using the following equation (19).

$$ST2 = f11(NRPM) \tag{19}$$
$$= C2 \cdot NRPM$$

where, C2=a constant.

The turbulence intensity coefficient ST2 may also be determined from a map.

Next, in a step S32, the controller 20 calculates a combustion rate F2 from a laminar flow combustion rate SL2 and the turbulence intensity coefficient ST2 using the following equation (20).

$$F1 = SL2 \cdot ST2 \qquad (20)$$

As noted above, the length of the main combustion period is unlikely to be affected by variations in temperature and pressure inside the combustion chamber 23. Therefore, a fixed value determined in advance through experiment is applied to the laminar flow combustion rate SL2.

In a following step S33, the controller 20 sets an air-fuel mixture mass BR2 which has burnt in the main combustion period BT2 at fifty eight (58) percent. The air-fuel mixture mass BR1 which has burnt in the initial combustion period BT1 is two percent, and hence the air-fuel mixture mass which has burnt up to the point at which the proportion of the burnt air-fuel mixture mass subsequently rises to sixty (60) percent is regarded as the air-fuel mixture mass BR2 during the main combustion period BT2.

Next, in a step S34, the controller 20 calculates the main combustion period BT2 by the following equation (21) which is similar to equation (18).

$$BT2 = \frac{(NRPM \cdot 6) \cdot (BR2 \cdot V_2)}{RPROBA \cdot AF2 \cdot F2} \qquad (21)$$

where, AF2=the reaction area of the flame kernel=a fixed value, and $V_2$=the cylinder volume at the starting point of the main combustion period.

AF2 is the average reaction area during the growth process of the flame kernel, and, similarly to AF1 in equation (18), is a fixed value which is determined in advance through experiment. The cylinder volume $V_2$ at the starting point of the main combustion period is also a fixed value. Degrees are used as the unit of the main combustion period BT2.

Figure 8:
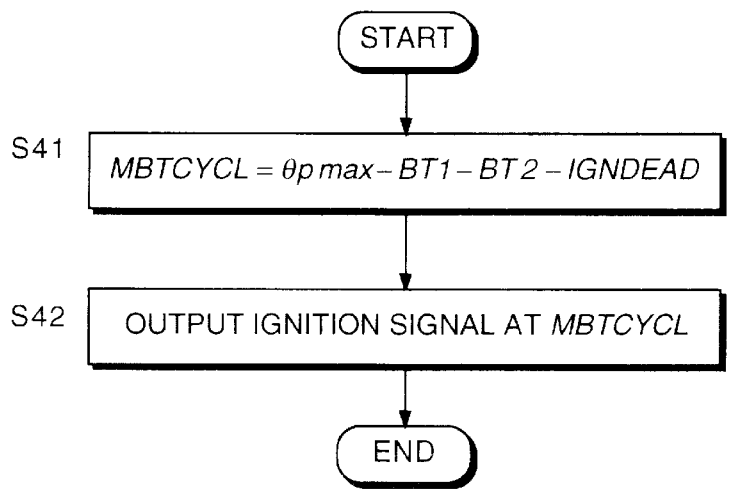
FIG. 8 is a flowchart explaining a routine performed by the controller for calculating a target ignition timing MBTCYCL.

FIG. 8 illustrates the calculation routine of the target ignition timing MBTCYCL.

First, in a step S41, the controller 20 calculates the target ignition timing MBTCYCL corresponding to MBT as the difference between the reference crank angle θpmax and the sum total of the initial combustion period BT1 calculated in the routine in FIG. 6, the main combustion period BT2 calculated in the routine in FIG. 7, and the ignition dead time IGNDEAD calculated in the routine in FIG. 5.

Next, in a step S42, a current is applied to the ignition coil 25 at the target ignition timing MBTCYCL.

In this control device, as described above, the target ignition timing MBTCYCL corresponding to MBT is calculated without calculating the mass of the unburnt gas in the cylinder 23, and as a result the calculation load can be greatly reduced.

Further, the initial combustion period BT1 is expressed by the functions of the mass of the air fuel mixture which is burnt during the period BR1, the cylinder volume $V_0$ at the starting point of initial combustion, the reaction probability RPROBA which expresses the combustibility of the air fuel mixture, and the combustion rate F1. Here, the initial combustion period BT1 lengthens as the air fuel mixture mass BR1 increases, the cylinder volume $V_0$ at the combustion starting point increases, the reaction probability RPROBA decreases, and the combustion rate F1 decreases, and as a result, the target ignition timing MBTCYL advances.

Similarly, the initial combustion period BT2 is expressed by the functions of the mass of the air fuel mixture which is burnt during the period BR2, the cylinder volume $V_0$ at the end point of the main combustion period, the reaction probability RPROBA which expresses the combustibility of the air fuel mixture, and the combustion rate F2. Here, the initial combustion period BT2 lengthens as the air fuel mixture mass BR2 increases, the cylinder volume $V_2$ at the end point of the main combustion period increases, the reaction probability RPROBA decreases, and the combustion rate F2 decreases, and as a result, the target ignition timing MBTCYL advances.

By calculating the combustion periods BT1 and BT2 in this manner as the functions of various parameters affecting the combustion period, the combustion periods BT1 and BT2 can be calculated accurately. As a result, the target ignition timing MBTCYL which is set on the basis of the combustion periods BT1 and BT2 can also be set with a high level of precision. Further, the combustion period is calculated by being divided into the initial combustion period BT1 which corresponds to the flame kernel growth period and during which temperature and pressure can have a great effect, and the main combustion period BT2 which is little affected by temperature or pressure. As a result, the calculation precision of the combustion period is enhanced. It is also possible to further enhance the calculation precision by further dividing the combustion period.

The contents of Tokugan 2001-344645, with a filing date of Nov. 9, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the aforementioned embodiment, the combustion rate F1 which is used in the calculation of the combustion period BT1 and the combustion rate F2 which is used in the calculation of the combustion period BT2 are calculated as the product of the laminar flow combustion rate SL1 and the turbulence intensity coefficient ST1, and the product of the laminar flow combustion rate SL2 and the turbulence intensity coefficient ST2 respectively. However, these values may be determined using the addition-based calculation method disclosed in the aforementioned U.S. Pat. No. 5,887,568.

In the above embodiments, the former is defined as zero to two percent mass proportion and the latter from two to sixty percent mass proportion. However, this invention is not necessarily limited to these numerical values.

The embodiments of this invention in which an exclusive property or privilege is claimed are defined as follows:

What is claimed is:

1. An ignition timing control device for use with an internal combustion engine, the engine performing a combustion of an air-fuel mixture in a combustion chamber according to an ignition by a spark plug, comprising:

a sensor which detects an operating condition of the engine; and a programmable controller programmed to:

calculate a reaction probability which expresses a combustibility of the air-fuel mixture in the combustion chamber on the basis of the operating condition;

calculate a combustion rate of the air-fuel mixture in the combustion chamber on the basis of the operating condition;

calculate an air-fuel mixture combustion period on the basis of a combustion chamber volume at a combustion start timing, the reaction probability and the combustion rate to cause the combustion period to be longer as the combustion chamber volume increases, to cause the combustion period to be shorter as the reaction probability increases, and to cause the combustion period to be shorter as the combustion rate increases;

calculate a target ignition timing by subtracting the combustion period from a first predetermined timing which is later than the combustion period start timing; and control an ignition timing of the spark plug to coincide with the target ignition timing.

2. The ignition timing control device as defined in claim 1, wherein the controller is further programmed to divide the combustion period into a plurality of divided periods which are calculated on the basis of different combustion chamber volumes and different combustion rates, and to calculate the combustion period by summing up the divided periods.

3. The ignition timing control device as defined in claim 2, wherein the controller is further programmed to calculate each of the divided period by first calculating a product of a combustion chamber volume when a divided period starts and an air-fuel mixture mass which is burnt during the divided period, and dividing the product by a product of the reaction probability and a combustion rate during the divided period.

4. The ignition timing control device as defined in claim 2, wherein the divided periods comprise an initial combustion period from the beginning of combustion of the air-fuel mixture to a formation of a flame kernel, and a main combustion period from the formation of the flame kernel to a point at which a pressure in the combustion chamber reaches a maximum value, and the controller is further programmed to calculate the main combustion period using a combustion rate which is greater than a combustion rate used in the calculation of the initial combustion period.

5. The ignition timing control device as defined in claim 4, wherein the controller is further programmed to set the combustion start timing at an identical crank angle to a previous ignition timing of the spark plug.

6. The ignition timing control device as defined in claim 4, wherein the controller is further programmed to set the initial combustion period to a period in which a proportion of a burnt air-fuel mixture mass in the combustion chamber ranges from zero to two percent, and sets the main combustion period to a period in which the proportion of the burnt air-fuel mixture mass in the combustion chamber ranges from two to sixty percent.

7. The ignition timing control device as defined in claim 1, wherein the operating condition detecting sensor comprises a sensor which detects a cooling water temperature of the engine, and the controller is further programmed to set the reaction probability to a larger value as the cooling water temperature increases.

8. The ignition timing control device as defined in claim 1, wherein the engine further comprises an exhaust gas recirculating passage which supplies a part of exhaust gas of the engine to the combustion chamber, and the controller is further programmed to calculate a residual exhaust gas ratio which expresses a ratio of exhaust gas included in the air-fuel mixture in the combustion chamber, and to set the reaction probability at a smaller value as the residual exhaust gas ratio increases.

9. The ignition timing control device as defined in claim 1, wherein the engine comprises a fuel injector which supplies fuel to the combustion chamber; the operating condition detecting sensor comprises a sensor which detects an intake air amount of the engine and a sensor which detects a fuel injection amount of the fuel injector, and the controller is further programmed to calculate an equivalence ratio from the intake air amount and the fuel injection amount and to set the reaction probability at a smaller value as the equivalence ratio deviates from a value corresponding to a stoichiometric air-fuel ratio.

10. The ignition timing control device as defined in claim 1, wherein the operating condition detecting sensor comprises a sensor which detects an intake air temperature of the engine and a sensor which detects an exhaust gas temperature of the engine, and the controller is further programmed to calculate an ambient temperature in the combustion chamber at the combustion starting timing from the intake air temperature, the exhaust gas temperature, and a compression ratio of the combustion chamber at the combustion start timing, and to calculate the combustion rate at a larger value as the ambient temperature rises.

11. An ignition timing control device for use with an internal combustion engine, the engine performing a combustion of an air-fuel mixture in a combustion chamber according to an ignition by a spark plug, comprising:

means for detecting an operating condition of the engine;

means for calculating a reaction probability which expresses a combustibility of the air-fuel mixture in the combustion chamber on the basis of the operating condition;

means for calculating a combustion rate of the air-fuel mixture in the combustion chamber on the basis of the operating condition;

means for calculating an air-fuel mixture combustion period on the basis of a combustion chamber volume at a combustion start timing, the reaction probability and the combustion rate to cause the combustion period to be longer as the combustion chamber volume increases, to cause the combustion period to be shorter as the reaction probability increases, and to cause the combustion period to be shorter as the combustion rate increases;

means for calculating a target ignition timing by subtracting the combustion period from a first predetermined timing which is later than the combustion period start timing; and means for controlling an ignition timing of the spark plug to coincide with the target ignition timing.

12. An ignition timing control method for an internal combustion engine, the engine performing a combustion of an air-fuel mixture in a combustion chamber according to an ignition by a spark plug, the method comprising:

detecting an operating condition of the engine;

calculating a reaction probability which expresses a combustibility of the air-fuel mixture in the combustion chamber on the basis of the operating condition;

calculating a combustion rate of the air-fuel mixture in the combustion chamber on the basis of the operating condition;

calculating an air-fuel mixture combustion period on the basis of a combustion chamber volume at a combustion start timing, the reaction probability and the combustion rate to cause the combustion period to be longer as the combustion chamber volume increases, to cause the combustion period to be shorter as the reaction probability increases, and to cause the combustion period to be shorter as the combustion rate increases;

calculating a target ignition timing by subtracting the combustion period from a first predetermined timing which is later than the combustion period start timing; and controlling an ignition timing of the spark plug to coincide with the target ignition timing.

* * * * *